April 23, 1968     R. H. SICKING     3,378,926
HOLLOW ENGRAVING POINTS

Filed May 19, 1967                        2 Sheets-Sheet 1

INVENTOR.
ROBERT H. SICKING
BY
*Harry A. Herbert Jr.*
*Charles H. Wagner*
ATTORNEYS April 23, 1968 — R. H. SICKING — 3,378,926
HOLLOW ENGRAVING POINTS
Filed May 19, 1967 — 2 Sheets-Sheet 2
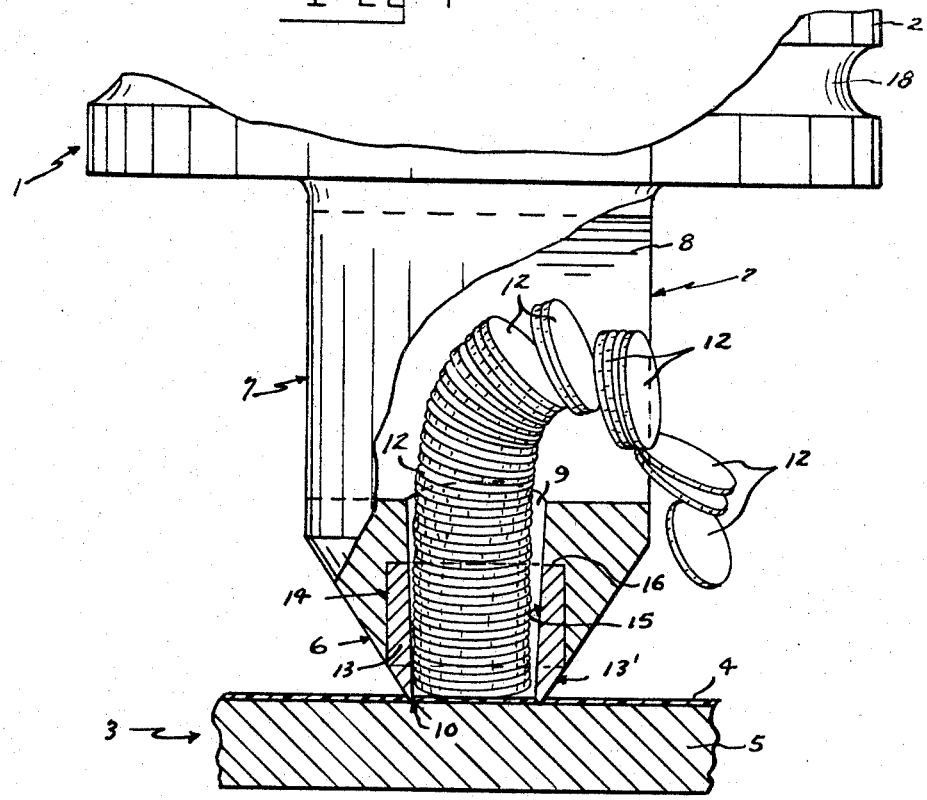
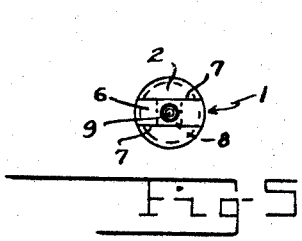
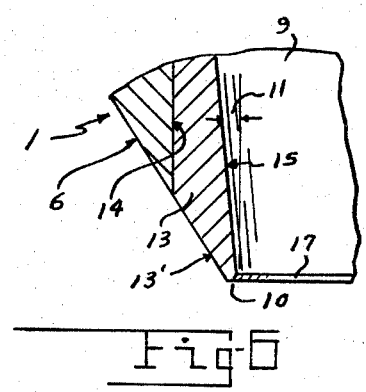
INVENTOR.
ROBERT H. SICKING
BY Harry A. Herbert Jr. and Charles H. Wagner
ATTORNEYS

United States Patent Office 3,378,926
Patented Apr. 23, 1968

3,378,926
HOLLOW ENGRAVING POINTS
Robert H. Sicking, 5705 Itaska Ave.,
St. Louis, Mo. 63109
Filed May 19, 1967, Ser. No. 641,422
2 Claims. (Cl. 33—18)

ABSTRACT OF THE DISCLOSURE

A data plotting machine engraving point or stylus having an elongated cylindrical body with a conical engraving tip having an upwardly and outwardly flared central longitudinal bore therein extending from said tip to provide an annular ring shape engraving extremity adjacent the conical tip. An enlarged cylindrical transverse passage is provided in the conical tip at the upper end of the upwardly flared passage having a greater diameter than the diameter of the upper end of the flared bore. The transverse passage extends across the upper portion of the conical tip at right angles to the central axis of the flared longitudinal bore and the opposite ends of the transverse cylindrical passage open outwardly at opposite sides of the upper portion of the conical tip. The sides of the tip are flattened at the outlet ends of the enlarged transverse cylindrical passage.

Cross references to related application

Application of Robert H. Sicking and Robert H. Sovar, Ser. No. 557,865, filed June 13, 1966, for Hollow Engraving Point, Holder and Cleaning Device for Engraving Coated Sheets.

Background of the invention

The invention relates to hollow engraving points for use in the engraving art, and more particularly to tools and apparatus used in the fine engraving of coated transparent sheets, explained in more detail in my copending patent application, namely application of R. H. Sicking and R. H. Sovar, Ser. No. 557,865, above referred to.

These engraving points are used to selectively remove certain specific portions of opaque or substantially opaque coatings, for instance of photographic negatives after development, for producing contour maps, engineering drawings, circuit master negatives and the like, involving the scribing or engraving data or information on the negatives or coated transparent sheets. The body of the negative, or an opaque coated transparent sheet may be glass, but is usually made of tough transparent and flexible plastic film covered or coated on one side with a coating, such as a photographically opaque coating, having proper physical characteristics. Such coated sheets and films are well known in the art.

The engraving apparatus carries an "engraving" point or stylus which is manipulated, preferably rapidly up and down, as it is selectively moved in transverse directions on the coated sheet (or the sheet is selectively shifted in one direction while the engraving point is selectively moved in the transverse direction) to cause "engraving" tip of the point or stylus to selectively remove a portion of the coating as it moves to leave transparent portions which can form the contour lines, letters, or designs as desired in the coating which may constitute a negative for subsequent viewing, or "printing."

These points have different shape and size engraving tips for scribing different width fine lines, etc. as explained in my copending, referenced patent application.

The engraving points, in removing the selected portions of the coatings from the transparent sheets, often clog up and the coating debris must be eliminated to keep the scribing or engraving tip clear. This has been done in several ways, one way being the provision of a mechanical plunger through the point for ejecting the debris of the coating which accumulates in the bore of the engraving point out of the bore. Another form is the provision of suction means to withdraw the coating debris displaced by the stylus through the interior (bore) thereof, and may also include an outer shell or suction hood surrounding the stylus "chuck" and the engraving tip, and spaced up slightly above the coating when the engraving tip or point is cutting or "engraving," these elements being connected (by flexible hose) to a suction pump.

Summary of the invention

The present invention provides a positive means for eliminating the coating debris which is engraved off of the coatings and enters the bore or central passage extending upwardly from the annular or ring shape cutting point, having for an object a simplified self cleaning hollow engraving point for use with conventional coated sheet engraving machines, data plotting equipment, etc., both mechanical, automatic and manual, which eliminates the necessity for positive central debris ejection rods in the bore of the cylindrical engraving point to remove the collected debris in the central passage, as well as the elimination of a vacuum jacket around the tip together with the vacuum and associated apparatus required, such as used in my referred to copending patent application.

A further object is the provision of an engraving point having an elongated cylindrical body with a conical or tapered engraving tip and having a debris discharge passage extending upwardly from the run of the conical tip to provide an annular engraving edge, in which the upper portion of the conical tip is flattened on its opposite sides and an enlarged cylindrical passage extends transversely across the central debris discharge passage perpendicular thereto in communication with the discharge passage, to discharge debris received from the discharge passage laterally at either side of the flat side portions of the upper portion of the conical engraving tip.

A further object is the provision of a hollow engraving point in which the upwardly extending debris discharge passage is flared upwardly and outwardly from the lower engraving end of the conical tip and the transverse passage which is in communication with the upper end of the upwardly and outwardly flared passage is cylindrical and larger in diameter than the upper end of the upwardly and outwardly flared debris discharge passage.

A further object is the provision of an elongated cylindrical engraving point in which the outwardly flared debris collection and the discharge passage is counterbored upwardly from the tip end of the point and a hardened wear resistant ferrule is fixed in the tip end having an outer taper conforming to the conical taper of the body of the tip and an inner upwardly flared bore conforming and contiguous to the upwardly flared passage with an annular flattened bottom at the tip with an interior annular shallow bevel leading into the upwardly flared central debris collection and discharge passage.

A further object is the provision of a plurality of grooves machined around the circumference of the shank near the tip to permit a firm grip on the otherwise highly polished and slippery point to facilitate insertion and removal of the point into and from the chuck of the engraving apparatus.

Other objects and advantages of the invention will become apparent from the following description and accompanying drawings in which like reference characters refer to like parts in the several figures.

*Brief description of the drawings*

FIGURE 4 is also a much enlarged fragmentary side view of the tip end of the engraving point, partly broken away and shown in section, and showing the engraving tip in engraving contact with the coated surface and the engraving debris being discharged through the transverse passage.

FIGURE 5 is an end view of the engraving tip end of the point as seen in FIGURE 1, and FIGURE 6 is a further enlarged vertical section showing engraving end of the tip insert which is beveled to provide an engraving or coating removing ring with the bottom edge flattened to eliminate a "knife" like cutting ring which might otherwise cut or damage the plastic base on which the softer coating is located.

*Description of the preferred embodiment*

Figure 1:
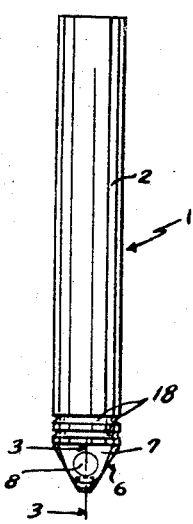
FIGURES 1 and 2 are somewhat enlarged side elevation views of a hollow engraving point incorporating the invention taken at right angles to each other.
Figure 2:
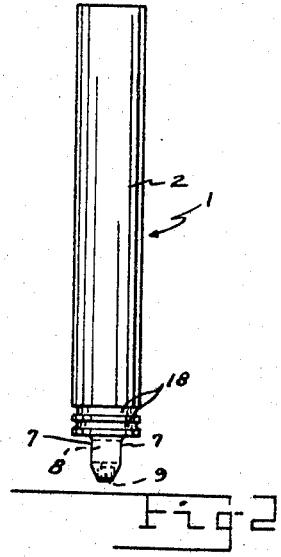

The engraving point, as seen more particularly in FIGURES 1 and 2, is indicated generally by the reference numeral 1 and comprises a small elongated cylindrical body or shank, normally made of steel. The upper portion of the shank, indicated at 2 is gripped in a collet or similar type chuck of a manual or automatic engraving instrument or device (not shown) but similar to the collet or chuck device for the engraving point as shown in my afore-referred to copending patent application, Ser. No. 557,865, filed June 13, 1966 for Hollow Engraving Points, Holders, and Cleaning Device for Engraving Coated Sheets.

The engraving point 1 is chucked in a collet carried by a stylus holder which is selectively moved, for instance along relatively perpendicular X and Y coordinates relative to the surface of a coated transparent sheet, indicated at 3 in FIGURE 4 in which the coating is indicated at 4 while the transparent supporting base is denoted at 5.

Figure 3:
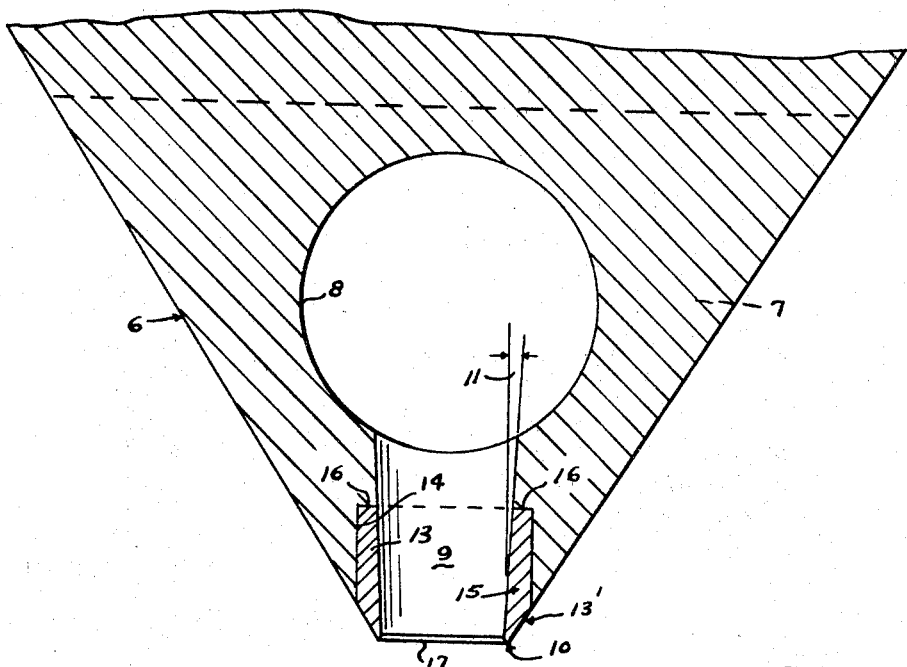
FIGURE 3 is an enlarged fragmentary vertical sectional view taken about on line 3—3 in FIGURE 1, looking in the direction of the arrows.

Referring again to FIGURES 1 and 2, the lower or engraving end of the point or stylus is conical as indicated at 6 and the opposite sides of this conical tip 6 are flattened and parallel as indicated at 7. A relatively large transverse cylindrical passage 8 extends across the upper end of the conical tip opening outwardly at the opposite sides of the flattened parallel faces 7—7 as shown more clearly in FIGURE 4 (and FIGURE 5). A short central debris discharge passage 9 which is circular in cross section extends upwardly from the engraving tip 10 with the upper end thereof opening into the enlarged transverse passage 8 as best seen in the enlarged views (FIGURES 3 and 4). This passage or longitudinal bore 9 is flared upwardly and outwardly as indicated at 11 to provide relief from possible packing or jamming of the "scrape coat" material or plugs that are cut or engraved from the coating 4. These scrape coat plugs or thin discs or debris from the coating are indicated at 12 in FIGURE 4.

The lower or tip end of the point has a "hard wear" tip, as indicated at 13, inserted in a counterbore 14 formed in the conical tip end 6 of the point. This tip 13 is in the form of a ferrule having a lower conical end 13' coextensive with the conical tip end surface 6 of the engraving point 1 and also having an upwardly and outwardly flared bore 15, the surface of which is coextensive with the upwardly flared bore 9. These inserts or "hard wear" engraving tips 13 are preferably fabricated from sapphire, tungsten carbide, or diamond or other very hard material.

The engraving tip insert 13 is force fitted and cemented under pressure to form a strong mechanical bond and a shoulder 16 is formed at the upper end of the counterbore 14 against which the upper end of the tip insert 13 engages.

The large transverse passage 8 is positioned above the tip insert 13 as closely as is possible while still maintaining enough metal in the shank to form a solid shoulder to prevent the tip 13 from being pushed all the way through in use.

The lower converging edge between the outer conical surface 14 and the inner upwardly flared bore 15 at the bottom of the insert tip 13 is flat and preferably formed with an annular interior bevel 17 as seen in FIGURE 6, although hardened inserts, without the interior lower beveled edge 17, are used.

The cylindrical shank or body portion 2 of the engraving point 1 is machined to provide grooves 18 around the circumference thereof adjacent the conical end 6 to provide a sufficient degree of friction to permit the fingers to firmly grip the otherwise highly polished and therefor slippery point, and thus facilitate insertion and removal of the point into and from the holding chuck (not shown) of the engraving machine or device (not shown).

As the engraving point 1 is moved across the coated transparent sheet 5 in the desired directions, for instance on the X and Y coordinates, to "trace" the particular predetermined configurations, diagrams, designs, lettering, etc., as desired with the point 1 securely held in the collet chuck of the engraving machine and reciprocated rapidly up and down the lower circular edge or rim 10 cuts or punches through the upper softer coating 4, as seen in FIGURE 4, down to the harder surface of the lower transparent base 5, and round slugs or discs 12 or parts thereof are progressively removed in the form of coating debris.

These discs or slugs 12, or portions of discs, are progressively moved upwardly in the upwardly flared short passage 9 and discharged into the enlarged transverse cylindrical passage 8 extending between the two flat sides or faces 7—7, where the column of slugs or discs 12 will tumble or fall laterally out of one or the other openings at the ends of the large transverse passage 8 at the point 1 is progressively moved along the coating surface 4 by the (not shown) engraving machine. The upwardly and outwardly flared bore 9 permits the slugs 12 to move vertically into the enlarged passage 8 without jamming. The engraving point 1 is, of course, very small. All of the figures of the drawing which disclose the needle or point are necessarily very much enlarged in order to show the details of construction more clearly. The engraving point, or hollow engraving needle 1, is usually reciprocated up and down by magnetic means such as, for instance, a solenoid and spring. However, the particular mounting and actuating means for moving the point 1 across the coating and reciprocating the same form no particular part of this invention and are therefore not shown in the drawings, nor described in much detail. The scribing point 1 can be used in the chuck of the engraving apparatus disclosed in my referred to copending patent application or in the collet chuck of any other commercial or well known "mapping" or engraving machine of the same general type.

Since the point 1 is quite small the annular grooves 18 are provided just above the conical tip 6 to afford a firm and positive grip on the shank 2 for withdrawing or inserting the engraving point from or into the collet chuck of an engraving machine.

For purposes of exemplification, a particular embodiment of the invention has been shown and described to the best understanding thereof. However, it will be apparent that changes and modifications in the arrangement and construction of the parts thereof may be resorted to without departing from the true spirit and scope of the invention as defined in the accompanying claims.

I claim:

1. A hollow engraving stylus for engraving apparatus, for selectively removing portions of opaque coatings from transparent coated sheets comprising, an elongated cylindrical stylus body having a conical lower end portion and a transparent coating discharge passage formed in the upper portion thereof opening through the side of said conical lower end portion, said conical lower end portion having an annular engraving rim, and a central, circular cross section, debris collecting and discharging bore extending upwardly therein from said annular engraving rim with the upper end of said bore opening into said transverse discharge passage for delivering coating debris removed from a coated transparent sheet by said rim through said bore into said transverse passage, for discharge therefrom through the side of said conical end portion, said bore being flared upwardly and outwardly from said rim to said transverse passage, said conical tip end portion having its opposite sides flattened, and parallel to each other and to the longitudinal axis of the stylus body, and said transverse passage extends between the opposite parallel flattened sides across the upper end of said bore, in open communication intermediate its ends into the bore at its upper end, said transverse passage opening at its opposite ends through said flattened parallel sides of said conical lower engraving tip end portion, said annular engraving rim having a beveled inner edge and said transverse debris discharge passage having a materially greater diameter than the diameter of said upwardly and outwardly flared central debris collecting and discharging bore at the juncture thereof with said transverse passage.

2. A stylus as set forth in claim 1 in which the tip end is counter-bored to provide a hardened engraving tip receiving socket, and includes a hard engraving ferrule tip fixed in said socket having a downwardly tapered outer conical surface contiguous with the conical surface of the tip end portion of the stylus body, and an inner upwardly and outwardly flared bore forming a contiguous upwardly and outwardly flared bore with the bore in the said conical tip end portion of the body, in which the inner bore and the outer conical surface of the hard engraving tip converge at the lower end to form a circular engraving rim at the lower edge of the insert.

References Cited
UNITED STATES PATENTS 2,087,186   7/1937   Freeman _____ 83—684

FOREIGN PATENTS 451,509   2/1913   France.
455,184   2/1950   Italy.

HARRY N. HAROIAN, *Primary Examiner.*